(12) United States Patent
Smith

(10) Patent No.: US 8,249,356 B1
(45) Date of Patent: Aug. 21, 2012

(54) PHYSICAL PAGE LAYOUT ANALYSIS VIA TAB-STOP DETECTION FOR OPTICAL CHARACTER RECOGNITION

(75) Inventor: Raymond Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 862 days.

(21) Appl. No.: 12/357,004

(22) Filed: Jan. 21, 2009

(51) Int. Cl.
 *G06K 9/48* (2006.01)
(52) U.S. Cl. ......... 382/199; 382/203; 382/182; 382/224
(58) Field of Classification Search .................. 382/199, 382/203, 182, 224
 See application file for complete search history.

(56) References Cited

OTHER PUBLICATIONS

Liang et al: "Document Layout Structure Extraction Using Bounding Boxes of Different Entities", IEEE, 1996.*
Antonacopoulos, A., et al., "ICDAR2007 Page Segmentation Competition," Proc 9th Int. Conf. on Document Analysis and Recognition, IEEE, Curitiba, Brazil, Sep. 2007, pp. 1279-1283.
Baird, H.S., et al., "Image Segmentation by Shape-directed Covers," Proc. 10th Int. Conference on Pattern Recognition, IEEE Atlantic City, NJ, 1990, pp. 820-825.
Breuel, T.M., et al., "Two Geometric Algorithms for Layout Analysis," Proc. of the 5th Int. Workshop on Document Analysis Systems V, Springer-Verlag 2002, pp. 188-199.
Chen, M., et al., "Unified HMM-based Layout Analysis Framework and Algorithm," SCI CHINA Ser F, 46(6), Dec. 2003, pp. 401-408.
Chowdhury, S.P., et al., "Segmentation of Text and Graphics from Document Images," Proc. of the 9th Int. Conf. on Document Analysis and Recognition, IEEE, Curitiba, Brazil, Sep. 2007, pp. 619-623.
Nagy, G., et al., "Hierarchical Representation of Optically Scanned Documents" Proc. 7th Int. Conf. on Pattern Recognition, Montreal, Canada, 1984, pp. 347-349.
Pavlidis, T., et al., "Page Segmentation and Classification," CVGIP: Graphical Models and Image Processing, 54(6), Nov. 1992, pp. 484-496.
Shafait, F., et al., "Performance Comparison of Six Algorithms for Page Segmentation," DAS, 2006, pp. 368-379.
Smith, R., "An overview of the Tesseract OCR Engine," Proc 9th Int. Conf. on Document Analysis and Recognition, IEEE, Curitiba, Brazil, Sep. 2007, pp. 629-633.
Tuceryan, M., et al., "Texture Segmentation Using Voronoi Polygons," IEEE Trans. on Pattern Analysis and Machine Intelligence, Feb. 1990, pp. 211-216, vol. PAMI-12.
Wahl, F., et al, "Block segmentation and text extraction in mixed text/image documents," Computer Graphics and Image Processing, 20, 1982, pp. 375-390.
"Google Code," Tesseract open source OCR engine, 2010, 3 pages, [online] [Retrieved on Jun. 21, 2010] Retrieved from the internet <URL:http://code.google.com/p/tesseract-ocr>.
"Leptonica" updated Apr. 5, 2010, 3 Pages, [online] [Retrieved on Jun. 21, 2010] Retrieved from the internet <URL:http://www.leptonica.com>.

(Continued)

*Primary Examiner* — Matthew Bella
*Assistant Examiner* — Ruiping Li
(74) *Attorney, Agent, or Firm* — Fenwick & West LLP

(57) ABSTRACT

Physical page layout analysis for optical character recognition is performed. A physical page layout analysis method finds constituent parts of an image and gives an initial data-type label, such as text or non-text. Within the text data, connected components are identified and analyzed. Tab-stops are detected from groups of edge-aligned connected components. The detected tab-stops are used to deduce the column layout of the page by finding column partitions. The column layout is then applied to find the polygonal boundaries of and a reading order of regions containing flowing text, headings, and pull-outs.

26 Claims, 14 Drawing Sheets

OTHER PUBLICATIONS

"The ISRI OCR Performance Toolkit," The Information Science Research Institute at UNLV, Jun. 21, 2007, 6 Pages, [online] [Retrieved on Jun. 21, 2010] Retrieved from the internet <URL:http://www.isri.unlv.edu/ISRI/OCRtk>.

* cited by examiner

300

301 — Find constituent parts and give a preliminary type label

303 — Find tab-stops

305 — Find column layout

307 — Find and order regions

901 — For each remaining candidate connected component:

903 — If at a left tab, attempt to trace a text line to the right.
If at a right tab, attempt to trace a text line to the left.

905 — Move to the next nearest connected component that overlaps in the vertical direction that is not too far away until there is none near enough or another candidate connected component is encountered, then stop.

907 — Establish a text line where two tab lines are linked by a successful trace.

FIG. 9

PHYSICAL PAGE LAYOUT ANALYSIS VIA TAB-STOP DETECTION FOR OPTICAL CHARACTER RECOGNITION

BACKGROUND OF THE INVENTION

1. Field of the Invention

This invention relates in general to optical character recognition systems and in particular to determining the layout of pages to identify the proper order of text elements to be read.

2. Description of the Related Art

Optical character recognition systems need page layout analysis to be able to extract text from complex pages, such as from books, magazines, journals, newspapers, letters, and reports. Without page layout analysis, an OCR system would attempt to recognize line drawings, graphics, and photographs as text, and would jumble the reading order of words in multi-column text. Physical page layout analysis, one of the first steps of optical character recognition, divides an image into areas of text and non-text, as well as splitting text into columns. Physical page layout analysis is distinct from logical layout analysis, which detects headers, footers, body text, numbered lists, and segmentation into articles.

Physical layout analysis is essential to enable an OCR engine to process images of arbitrary pages. Existing physical layout analysis methods divide roughly into two categories: bottom-up analysis methods and top-down analysis methods. Each of these methods has associated disadvantages.

Bottom-up methods are the oldest methods. They classify small parts of the image (pixels, groups of pixels, or connected components) and gather together like types to form regions. The key advantage of bottom-up methods is that they can handle arbitrarily shaped regions with ease. The key disadvantage is that they struggle to take into account higher-level structures in the image, such as columns. This often leads to overfragmented regions.

Top-down methods cut the image recursively in vertical and horizontal directions along whitespaces that are expected to be column boundaries or paragraph boundaries. Although top-down methods have the advantage that they start by looking at the largest structures on the page, they are unable to handle the variety of formats that occur in many magazine pages, such as non-rectangular regions and cross-column headings that blend seamlessly into the columns below.

A third category of methods is based on analysis of the whitespace in an image. This solves some of the flaws in the recursive top-down methods, by finding gaps between columns by a bottom-up analysis of the gaps, looking explicitly for white rectangles. These methods still suffer from the problem of being unable to handle non-rectangular regions.

SUMMARY OF THE INVENTION

The present invention provides methods, systems, and computer-readable storage media for performing physical page layout analysis via tab-stop detection for optical character recognition. Embodiments include a physical page layout analysis method that finds constituent parts of an input image. The input image may include multi-column text in a non-rectangular layout. The constituent parts of the input image are given an initial data-type label, such as text or non-text. Within the text data, connected components are identified and analyzed. Tab-stops are detected from groups of edge-aligned connected components. In one embodiment, for each connected component that is a candidate for being located at a tab-stop, a vertical gutter is established beside the candidate, and it is determined whether neighboring connected components are in the gutter and whether neighboring connected components are edge-aligned with the candidate. The detected tab-stops are used to deduce the column layout of the page by finding column partitions. In one embodiment, sets of column partitions are used to identify regions of uniform column layout. The column layout is then applied to find the polygonal boundaries of and a reading order of regions containing flowing text, headings, and pull-outs. Metadata describing the regions and/or the logical reading order of the regions can then be output for use by an OCR process.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 3 is a flowchart illustrating a method of finding a page layout, in accordance with one embodiment.

FIG. 9 is a flowchart illustrating a method of performing line tracing, in accordance with one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

1. Overview

Figure 1:
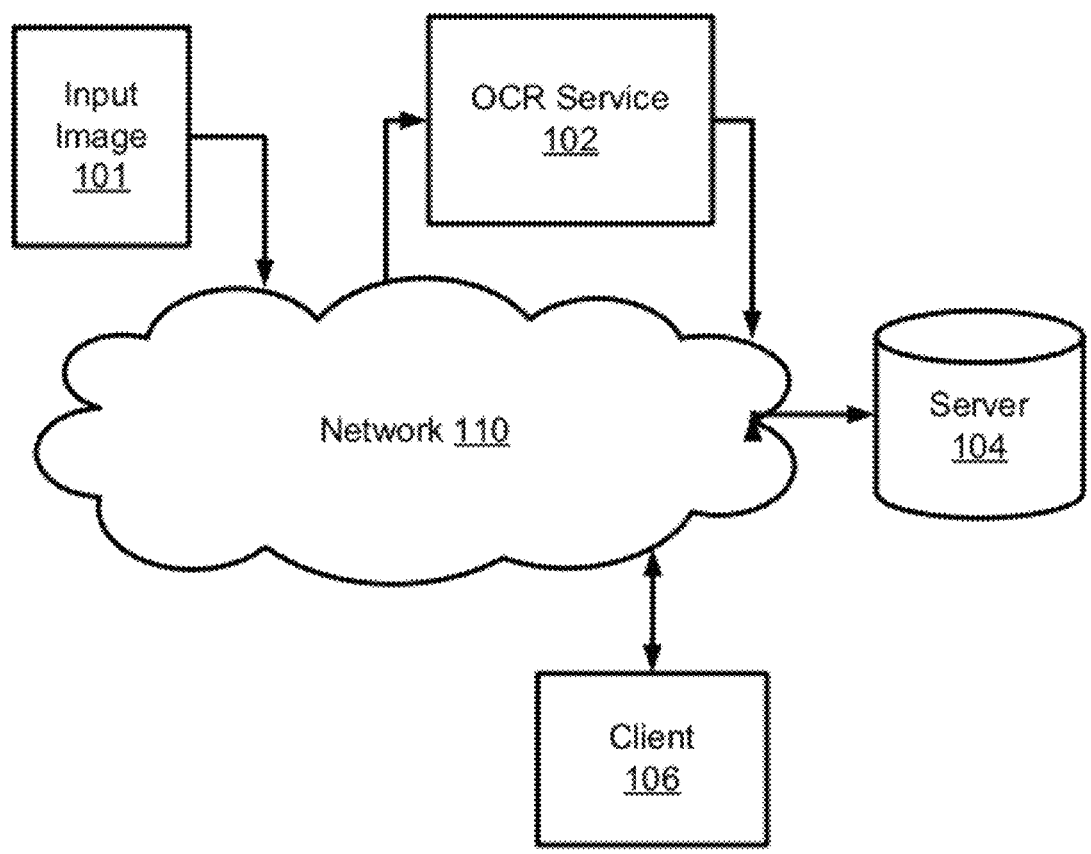
FIG. 1 is a high-level block diagram of a computing environment, in accordance with an embodiment.
Figure 2:
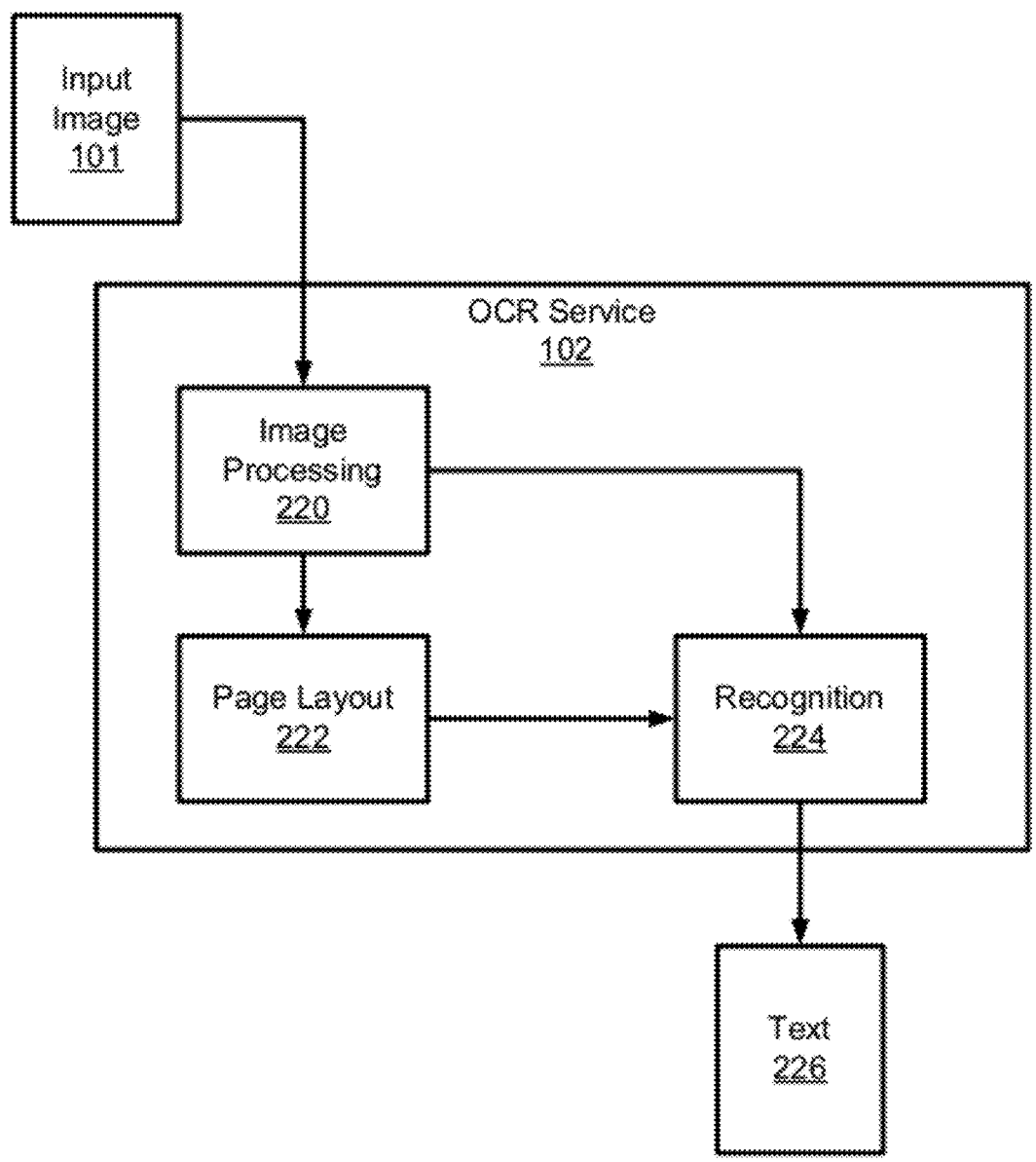
FIG. 2 is a high-level block diagram illustrating modules within the OCR service, in accordance with one embodiment.

The present invention provides systems, methods, and computer-readable storage media for performing physical page layout analysis via tab-stop detection and to determine the proper reading order for optical character recognition. There are four main phases of performing the physical page layout analysis. First, preprocessing is performed to find constituent parts of an image and give an initial data-type label, such as text or non-text. Within the text data, connected components are identified and analyzed. Second, tab-stops are detected from groups of edge-aligned connected components. Third, the detected tab-stops are used to deduce the column layout of the page by finding column partitions. Fourth, the column layout is then applied to find the polygonal boundaries of and a reading order of regions containing flowing text, headings, and pull-outs. FIGS. 1-3 illustrate an overview of the computing environment and the operation of embodiments of the invention.

FIG. 1 is a high-level block diagram of a computing environment 100, in accordance with an embodiment of the present invention. FIG. 1 illustrates an input image 101 that is transmitted to an OCR service 102 over a network 110. The OCR service 102 may comprise, for example, special purpose computer hardware, or may be software running on the processor of a computer. The OCR service 102 may store the recognized text from the input image 101 in a database associated with a server 104. Alternatively, the OCR service 102 may output metadata that can be used by an OCR process to read the text in a logical order. A client 106 can access the stored text or the metadata through the server 104 over the network 110. The client 106 can be any type of client device such as a personal computer, personal digital assistant (PDA), or a mobile telephone, for example.

The input image 101 can be from any source, such as an image of a page from a book, magazine, letter, or newspaper, or a photograph, a screenshot, or another document of any kind. For purposes of the description below, the input image 101 will be referred to herein as a page. The page may contain multi-column text, headings, pull-outs, graphics, drawings, and/or other images. When a page is laid out, either by a professional publishing system, or by a common word processor, the regions of a page are bounded by tab-stops. The margins, column edges, indentation, and columns of a table are all placed at fixed x-positions at which edges or centers of text lines are aligned vertically, and thus all can be considered to be located at tab-stops. The occurrence of different tab-stop locations can be used to distinguish tables from body text. Tab-stops can also be used to establish the boundary around non-column elements of the page, such as inset images and pull-out quotes.

The network 110 represents the communication pathways between the OCR service 102, the server 104, and the client 106. In one embodiment, the network 110 is the Internet. The network 110 can also use dedicated or private communications links that are not necessarily part of the Internet. In one embodiment, the network 110 uses standard communications technologies and/or protocols. Thus, the network 110 can include links using technologies such as Ethernet, Wi-fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), and the extensible markup language (XML). In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

FIG. 2 is a high-level block diagram illustrating modules within the OCR service 102 in accordance with one embodiment. Those of skill in the art will recognize that other embodiments can have different and/or other modules than the ones described here, and that the functionalities can be distributed among the modules in a different manner. The OCR service 102 includes an image processing module 220, a page layout module 222, and a recognition module 224. The image processing module 220 accesses the input image 101 and can perform image enhancement, deskew, scaling, and/or other aspects of preliminary image processing. The page layout module 222 determines the layout of the input image 101, including determining the column structure of the text, and the presence of headings, pull-outs, graphics, etc., in order to determine the proper reading order. In one embodiment, the recognition module 224 uses the results from the image processing module 220 and the page layout module 222 to perform text recognition in the proper reading order and to output recognized text 226. In another embodiment, the OCR service 102 outputs metadata that can be used by the recognition module 224 or another OCR process to read the text in a logical order. The operation of the page layout module 222 is described in further detail below.

FIG. 3 is a flowchart illustrating a method 300 of finding a physical page layout via tab-stop detection, in accordance with one embodiment, as for example, may be undertaken by the image processing module 220 and the page layout module 222. Note that the four steps 301, 303, 305, and 307 of the method 300 correspond to the four main phases of performing physical layout analysis via tab-stop detection. Each of these phases will be described in detail in the following sections.

2. Preprocessing

First among the four main phases of performing the physical page layout analysis via tab-stop detection is the preprocessing phase. Preprocessing is performed to find constituent parts of an image and give an initial data-type label, such as text or non-text. Within the text data, connected components are identified and analyzed.

Figure 4:
FIG. 4 is an example of an input image having multicolumn text, headings, and an image pullout.

In step 301 of the method 300, the input image 101 (i.e., the page) is analyzed to find the constituent parts and to give each of the constituent parts a preliminary label according to type in step 301. This type of image processing may be done according to existing functionality present in the Leptonica image processing software available at http://www.leptonica.com, or using various other morphological algorithms to perform image processing. FIG. 4 is an example of an input image 400 having multicolumn text 441, headings 442, and an image pullout 444. The tab-stops in the example of FIG. 4 are the column boundaries, the boundaries of the pull-out image, with an additional tab-stop for paragraph indentation that is not required for finding the page layout.

As part of step 301 of the method 300, the image processing module 220 of the OCR service 102 can identify and label lines separating parts of the page, pixels making up images from the page (such as pictures, graphics, etc.), and connected groups of pixels that may be text. In one implementation, 4-connectivity is used to find groups of pixels. In other implementations, 8-connectivity may be used. In one embodiment, first, parts of the page that are likely dividing lines and inset images are removed. Then, the remaining groups of contiguous black pixels, referred to herein as connected components, are separated into likely text components and components of uncertain type. By removing the lines and inset images first, the system can analyze the connected components more quickly.

As a further part of step 301 of method 300, a size filter or filters for connected components is used to filter out small connected components that are likely noise rather than text, and large connected components that are likely headings or non-text. In one implementation, the connected components are filtered by height into small (noise or diacriticals), medium (body text), and large (headings or non-text) sizes. In some implementations, neighboring connected components are examined to determine which connected components are text. In some implementations, the stroke width and the perimeter of the connected component is used to determine which connected components are text, according to techniques known to those of skill in the art. The large text is important information in the layout analysis, as headings help to determine the reading order. It is therefore important to correctly identify large objects that will contribute to the analysis, and make sure they are used, while not using objects such as frames, logos, and line-drawings. In one implementation, large connected components that have a good stroke-width are moved to the list of medium-sized connected components and considered text, and small connected components may be ignored initially. In one implementation, large connected components are considered text at this stage if there is a left or right neighbor that has a similar stroke width. On some fonts, the stroke width is greater on vertical lines than on horizontal lines, so the stroke width is calculated independently for both horizontal and vertical directions. For example, stroke width is calculated from horizontal and vertical local maxima of the distance function on the binary image of the connected component.

3. Tab-Stop Detection

The second of the four main phases of performing the physical page layout analysis is tab-stop detection. Tab-stops are detected from groups of edge-aligned connected components as described in greater detail with reference to FIGS. 3 and 5-8B below.

After the constituent parts of the page are found and preliminarily labeled according to type in step 301, the next step in the method 300 is to find which connected components are potentially on the tab-stop positions in step 303. The process of finding tab-stops 303 has several sub-steps: (1) candidate tab-stop connected components that may be at the edge of a text region are found; (2) candidate tab-stop connected components are grouped into tab-stop lines; and (3) connections between tab-stop lines are found, enabling removal of false positives (i.e., candidate tab-stop connected components that were grouped into a line where no tab-stop exists on the page).

Figure 5:
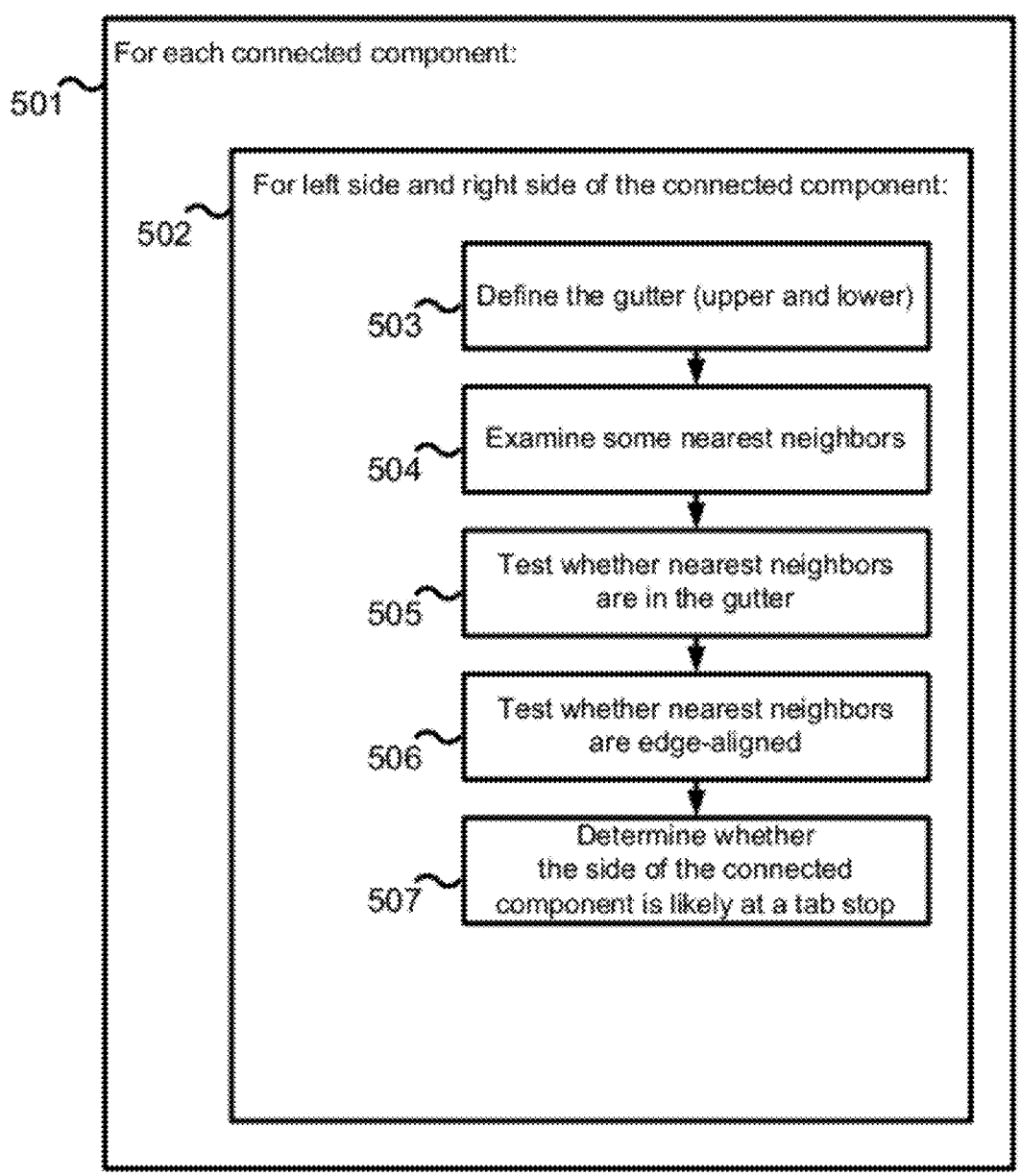
FIG. 5 is a flowchart illustrating a method of performing initial tab detection, in accordance with one embodiment.
Figure 6:
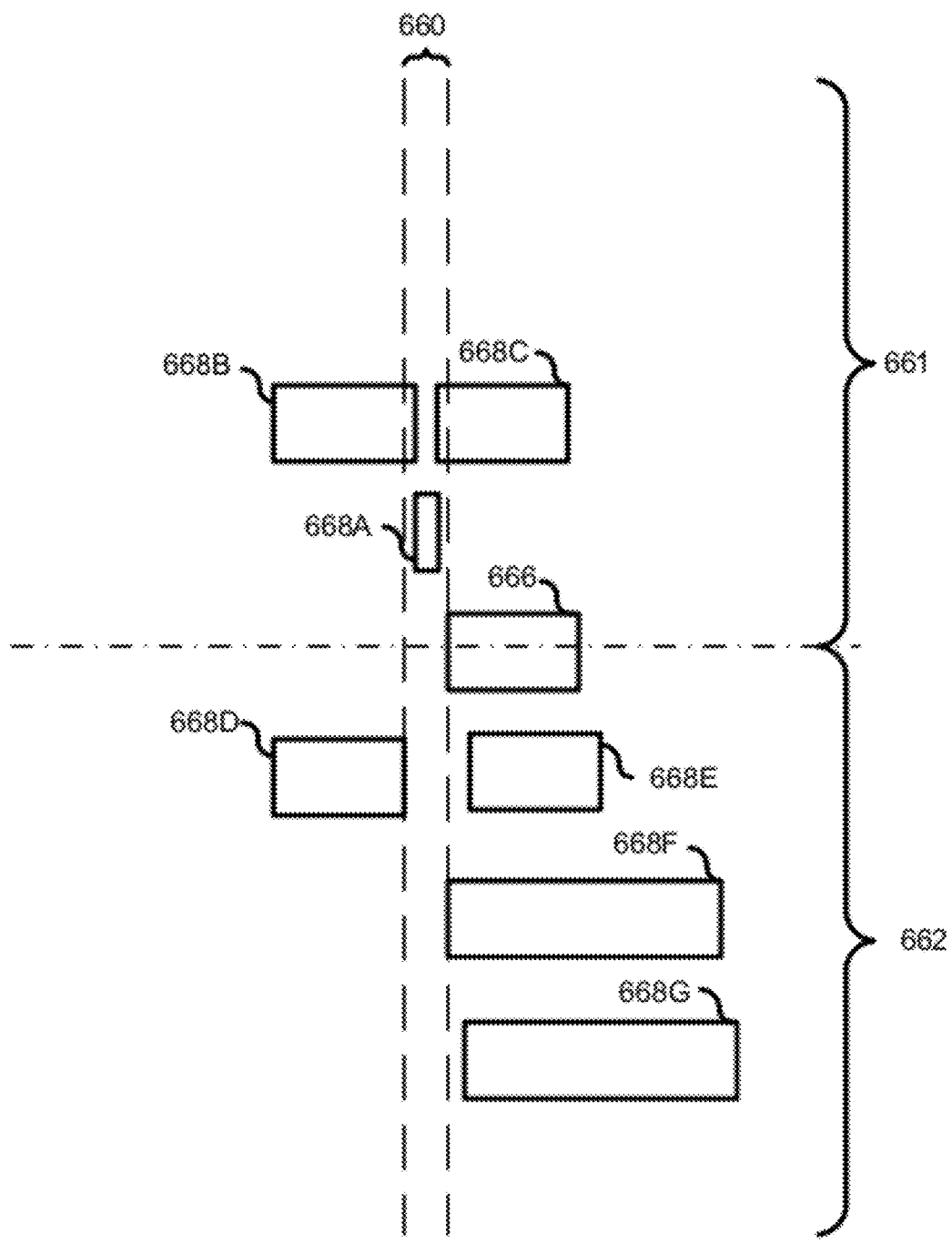
FIG. 6 is an illustration of connected components lying in and outside of a gutter defined by the edge of one of the connected components, in accordance with one embodiment.

FIG. 5 is a flowchart illustrating a method 500 of performing initial tab detection, in accordance with one embodiment. For each connected component 501 and for the left side and the right side of the connected component 502, each of the steps 503-507 are performed. The initial tab detection method 500 is further illustrated with reference to FIG. 6, which shows connected components 668A-G lying in and outside of a gutter 660 defined by the left edge of a connected component in question 666. For simplicity, the connected components 668A-G are shown as rectangles, but they may in fact be any regular or irregular contiguous shape.

In step 503 of the method 500, the vertical gutter 660 immediately to the left or right, respectively, of the connected component in question 666 is defined, for both the upper 661 and lower 662 portions of the page. The upper 661 and lower 662 portions of the page are defined with respect to the position of the connected component in question 666 on the page. In one embodiment, the gutter 660 is defined to be of a width that is a fraction or multiple of the height of the connected component in question 666, for example, half of the connected component's height. A similar vertical gutter 660 is established on the right side of the connected component in question 666 when the opposite side is considered in step 502.

In step 504 of the method 500, the nearest neighboring connected components to the connected component in question 666 are examined. In one implementation, the nearest neighbors are found by a radial search starting at the connected component in question 666. In other embodiments, only some of the connected components in the vicinity of the connected component in question 666 are examined. The neighbors 668A-F are tested 505 to determine whether they are in the gutter 660. Assuming that the connected component is at a tab-stop, the search should find no neighbors 668 in the gutter in upper 661 portion of the page, the lower 662 portion of the page, or both. If a neighbor is in the gutter in the upper 661 portion of the page with respect to the connected component in question 666, such as connected component 668A, then that is evidence that a tab-stop is not present on that side of the connected component in question 666 for the upper 661 portion of the page. If a neighbor's right edge is in the gutter to the left of the connected component in question 666, such as connected component 668B, in some embodiments it is conclusive evidence that a tab-stop is not present on that side of the connected component in question 666 for that portion (upper 661 or lower 662) of the page. However, even if there is evidence against a tab-stop being present with respect to one (upper 661 or lower 662) portion of the page for a side of the connected component in question 666, a tab-stop may still be present on that side of the connected component in question 666 for the other (upper 661 or lower 662) portion of the page.

In step 506 of the method 500, the nearest neighbors 668A-F are also tested for whether they are edge-aligned with the component in question 666. Finding neighbors 668E-G that have left edges aligned within a reasonable tolerance below the left edge of the connected component in question 666 is evidence in support of the connected component in question 666 being located at a tab-stop on the left side. Finding neighbor 668C with its left edge in the gutter is evidence against the connected component in question 666 being located at a tab-stop on the left side.

In step 507 of the method 500, each connected component is processed independently and the evidence in support and against a tab-stop being present on the left and right side is weighed to determine whether the side of the connected component in question 666 is likely at a tab-stop. The connected component in question 666 is then marked according to whether it is a candidate for being located at a left tab, a right tab, or neither. Connected components that are determined to be candidates for being located at a left or right tab will be referred to hereinafter as "candidate connected components."

Figure 7:
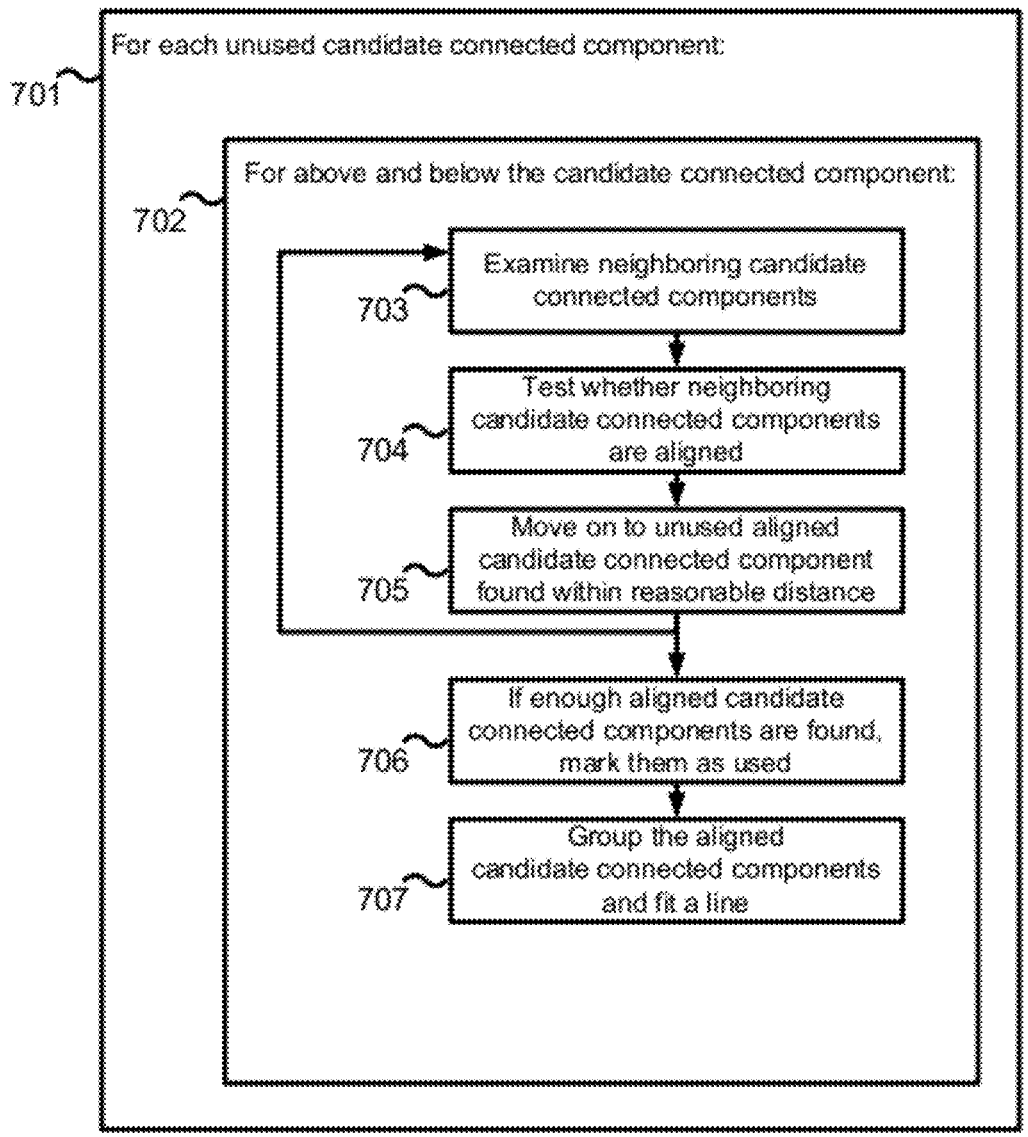
FIG. 7 is a flowchart illustrating a method of grouping candidate connected components at tab-stops into lines, in accordance with one embodiment.

FIG. 7 is a flowchart illustrating a method 700 of grouping candidate connected components at tab-stops into lines, in accordance with one embodiment. The method 700 of grouping candidate connected components at tab-stops into lines is further illustrated with reference to FIG. 8A, which shows aligned candidate connected components at a left tab-stop, and with reference to FIG. 8B, which shows a ragged alignment of candidate connected components at a right tab-stop. For each yet unused candidate connected component 701, and for above and below the candidate connected component 702, the steps 703-707 of the method are performed.

The steps 703, 704, and 705 form a loop in the method 700. In step 703, the neighboring candidate connected components are examined. In the example in FIG. 8A, beginning with candidate connected component 881A, the neighboring candidate connected component is 881B below. In step 704 of the method 700, the neighboring candidate connected component 881B is tested to determine whether it is aligned with the beginning candidate connected component 881A. If the neighboring candidate connected component 881B is aligned and within a reasonable distance then the method 700 moves on to consider the neighboring candidate connected components of candidate connected component 881B in step 705. Thus, within the loop of steps 703-705 of the method 700, the method moves from one unused neighboring candidate connected component to the next until no more are found within a reasonable distance. As shown in the example in FIG. 8A, the method 700 moves from candidate connected component 881A to 881B, to 881C, to possibly to 881D depending on the threshold set for a reasonable distance. In one embodiment, the threshold is set high enough to accommodate the continuance of line of tab-stops through a blank line of text, but set low enough to avoid continuing through the vertical span of a heading or a title, which may signal a new page layout. In some embodiments, candidate connected component 881E may be considered too far away from candidate connected component 881D.

In step 706 of the method 700, once no more unused aligned candidate connected components are found within a reasonable distance, if enough aligned candidate connected components have been found, then they are marked as "used." This prevents revisiting these candidate connected component later in the method 700.

In step 707, the aligned candidate connected components are grouped and fit into a line. In one embodiment, a least median squares algorithm is used to fit a line to the appropriate left or right edge of each candidate connected components. The line defines the position of a tab-stop for the vertical span of the line on the page. In one embodiment, after finding all tab-stop line segments, all the lines are refitted to the page-mean direction, such that all candidate connected components fall to the correct side of the line segment.

Figure 8A:
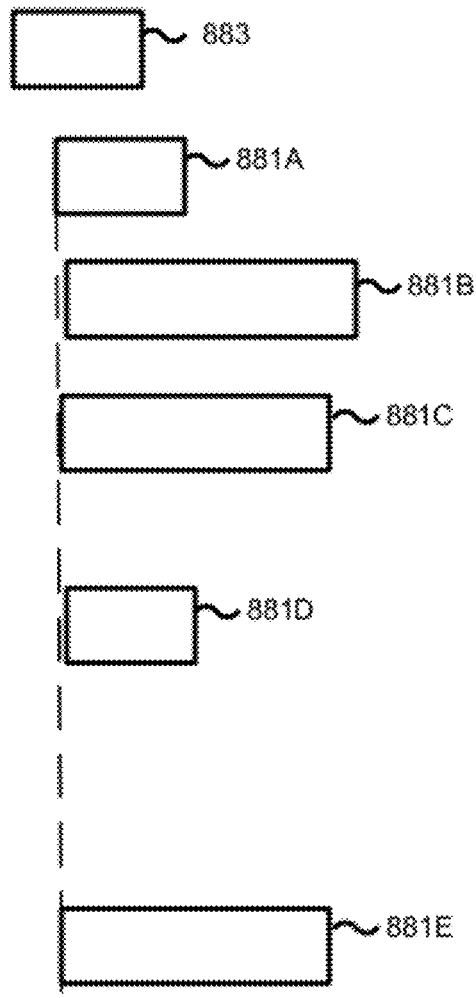
FIG. 8A is an illustration of aligned candidate connected components at a left tab-stop, in accordance with one embodiment.
Figure 8B:
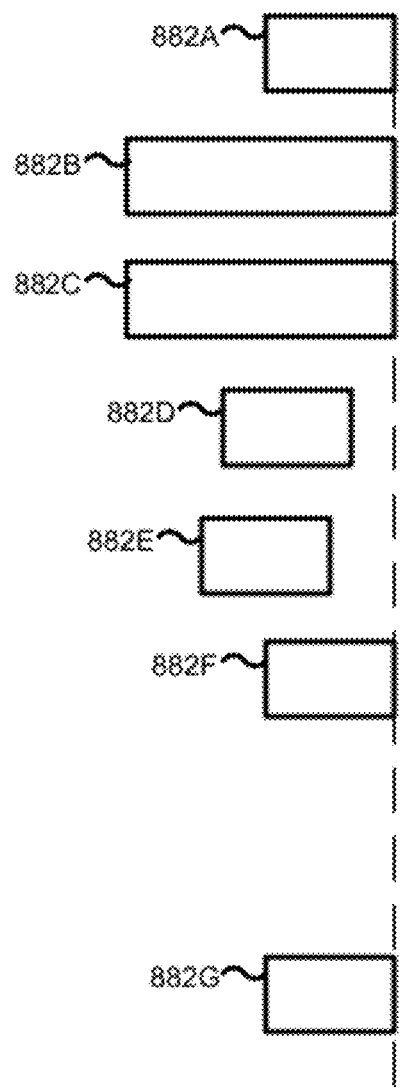
FIG. 8B is an illustration, which shows a ragged alignment of candidate connected components at a right tab-stop, in accordance with one embodiment.

FIG. 8B illustrates a grouping of candidate connected components along a right tab, for example in a left-justified column of text. In one embodiment, the method 700 of grouping candidate connected components at tab-stops into lines proceeds as described above, however, after failing to find an aligned candidate connected component within a reasonable distance below candidate connected component 882C, candidate connected components 882D and 882E may be considered as the ragged edge of the tab-stop. If they are within a threshold of distance from being aligned with a neighboring candidate connected component, the method may move on to consider the neighbors of candidate connected components 882D and 882E, which allows the system to discover aligned candidate connected component 882F. However, depending on the thresholds set, for example, the vertical distance of one blank line of text, candidate connected component 882G may be too far away to be grouped into the same line.

After all of the unused candidate connected components have been considered according to the process in FIG. 7, all of the candidate connected components that did not go into a line are no longer considered candidates for being located at a left or right tab. In one embodiment, at this stage, similar lines are merged, and the tabs are evaluated by measuring the density of coverage of candidate connected components along the tab. The ends of the tab lines may be truncated to the last candidate connected component.

4. Column Layout

The third of the four main phases of performing the physical page layout analysis via tab-stop detection is deducing the column layout of the page by finding column partitions from the detected tab-stops. Referring back to FIG. 3, after the tab-stops are found 303, the column layout is found 305. The process of finding the column layout will be described in more detail with reference to FIGS. 9-12.

The process of finding the column layout 305 begins with attempting to trace text lines starting at one tab line and ending at another. A trace can be made sequentially through closely adjacent, vertically overlapping connected components, but large gaps cannot be jumped. Where it is possible to trace from one tab line to another, the tab lines are associated with each other, as being likely opposite sides of a text column.

FIG. 9 is a flowchart illustrating a method of performing line tracing, in accordance with one embodiment. For each remaining candidate connected component 901, in step 903, if it is located at a left tab, then attempt to trace a text line to the right. If it is located at a right tab, then attempt to trace a text line to the left. In either case, in step 905, the page layout module 222 of the OCR service 102 moves on to consider the next nearest connected component to the right or left side, respectively, that overlaps in the vertical direction with the previous connected component. If the next nearest connected component is too far away or if another candidate connected component is encountered, then the trace is completed. The next nearest connected component may be deemed too far away if the distance exceeds a threshold set. In one embodiment, the threshold is set high enough to accommodate a reasonable spacing between words, but low enough to avoid continuing a text line trace through a distance of several spaces in a row. The objective is to avoid connecting a body text line to a pull-out quote or figure caption that may lie adjacent to the body text, but be separated horizontally. In one embodiment, the threshold is set to three times the connected component height, but higher or lower thresholds may also be used. In step 907, a text line is established where two tab lines are linked by a successful trace. Tab lines that were formed according to the method 700 shown in FIG. 7 are discarded if they are unable to be traced through connected components to another tab line. In some embodiments, statistics about the widths of text lines traced in this way are gathered for later use, as described below.

Figure 10:
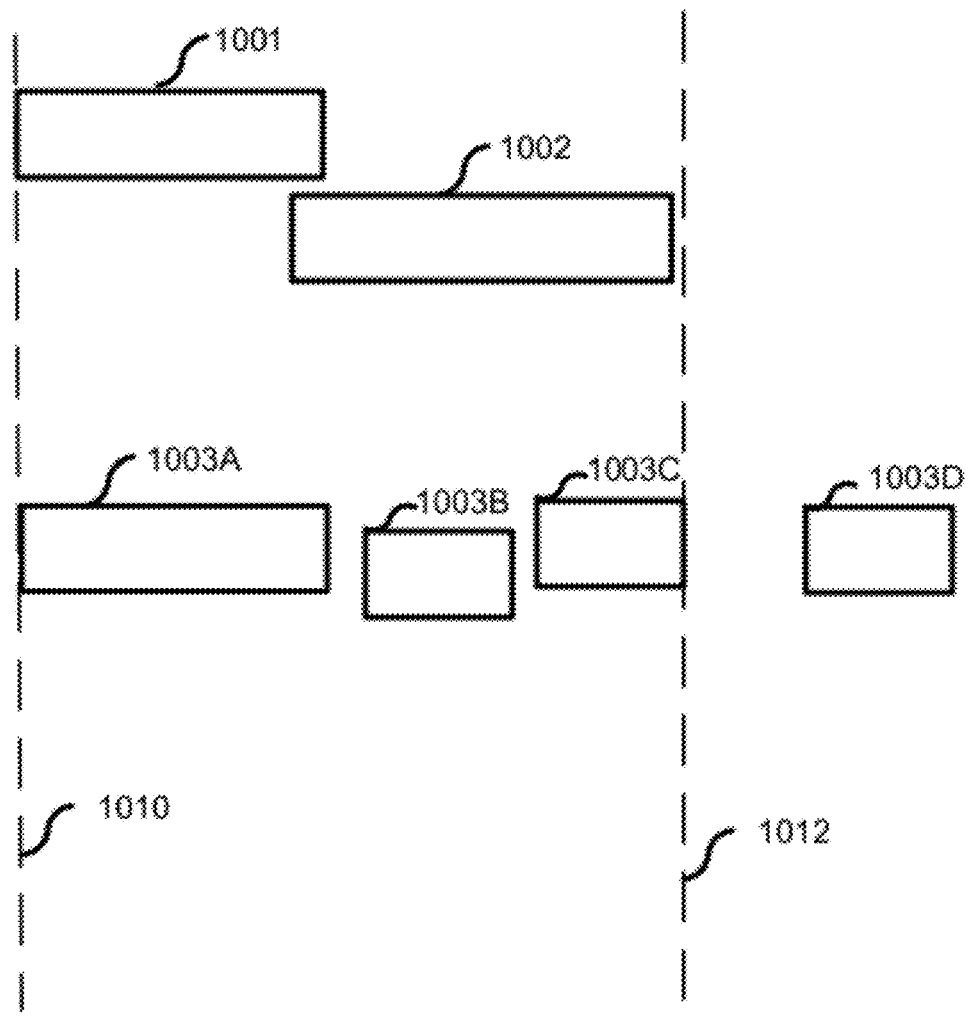
FIG. 10 is an illustration of a successfully traced line of connected components, in accordance with one embodiment.

FIG. 10 is an illustration of an example of set of connected components 1003A, 1003B, and 1003C that overlap in the vertical direction and are not too far away, that can be successfully traced from a left tab line 1010 to a right tab line 1012. FIG. 10 also illustrates an example of two connected components 1001, 1002 that do not overlap in the vertical direction. Thus, no successful trace can be made between them. Note that connected component 1003D overlaps with connected component 1003C in the vertical direction, but connected component 1003C is a candidate connected component. Thus, according to step 905, the trace is stopped when it encounters the next connected component 1003C, rather than moving to connected component 1003D. In some implementations, a threshold is established for the amount of vertical overlap required to count as being vertically overlapping, i.e., in the same text line. In one implementation, a smoothing algorithm is applied to dynamically adjust the upper and lower boundaries of the text line as the method moves on to adjacent connected components.

Figure 11:
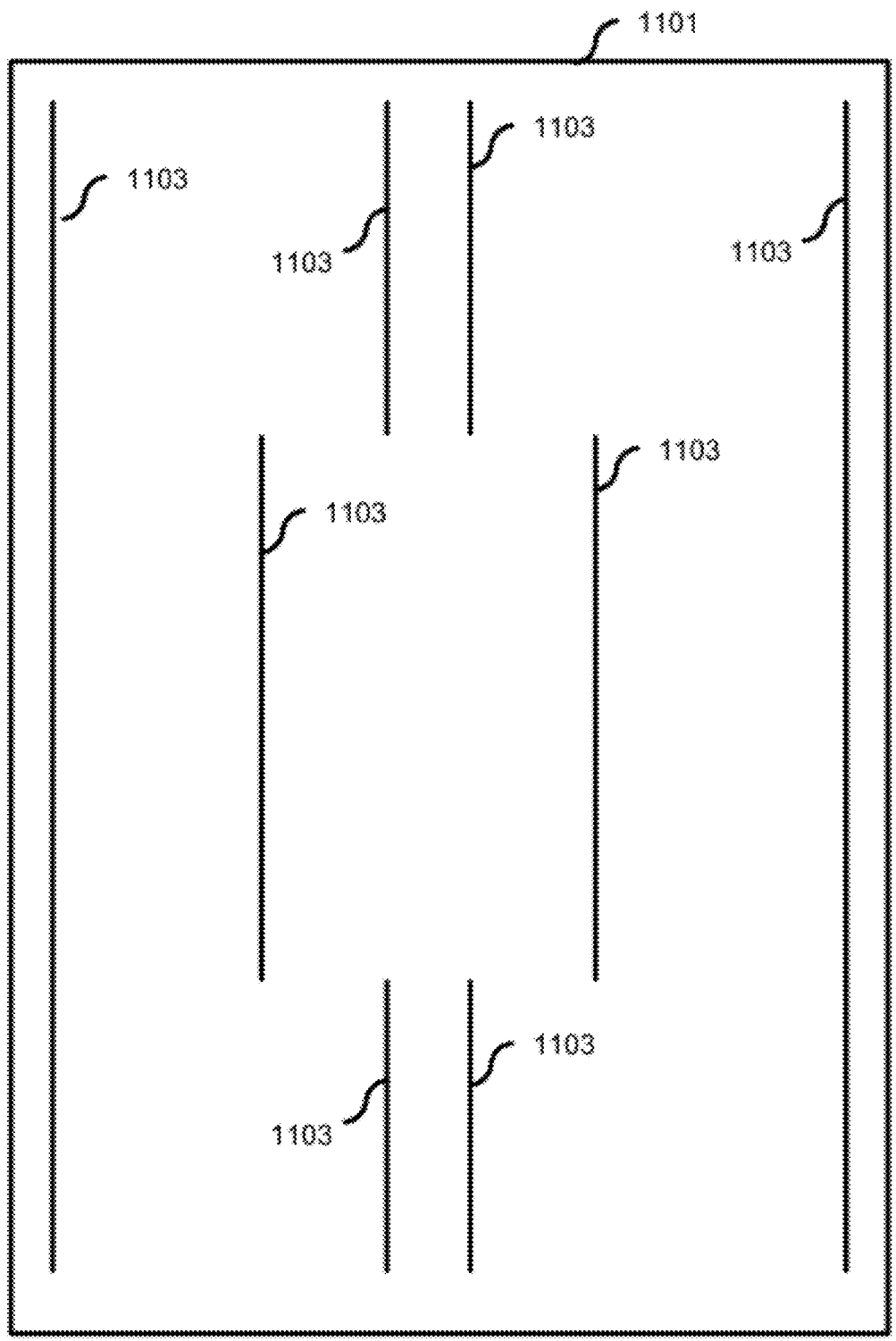
FIG. 11 is an illustration of the final tab-stop lines for a page, in accordance with one embodiment.

The process of finding the column layout 305 in the method 300 continues with an attempt to make connected tab lines end at the same y coordinate, by allowing the ends to move between the last candidate connected component whose edge was used for the tab line, and the first connected component that was not used for the tab line that the tab line intersects. Referring to FIG. 8A, the bottom end of the tab line is allowed to be anywhere between the bottom of 881D and the top of 881E. The top end of the tab line is allowed to be anywhere between the top of 881A, and the bottom of 883. In one implementation, tab lines that are connected to the same opposite tab line are adjusted to have a common ending y-coordinate, as are back-to-back, unconnected tab lines that are on opposite sides of a column gap. The common y-coordinate may be anywhere in the range covered by the maximum of the minima of the common ends, and minimum of the maxima of the common ends. In one embodiment, the center of this range is chosen. FIG. 11 is an illustration of the final tab-stop lines 1103 for a page 1101, after the lengths of the tab-stop lines 1103 have been adjusted according to the above constraints.

After the construction of the tab-stop lines, the connected components are re-classified as text or unknown using the same text-line tracing method that was described with reference to FIG. 9 to find connections between tab-stop lines. If a group of connected components of significant width form a text line, then they are classified as text. In one embodiment, artificial image connected components of about the same size as the body text connected components are created from the image mask from the morphological preprocessing that was performed by Leptonica or another morphological algorithm, as discussed above.

Figure 12:
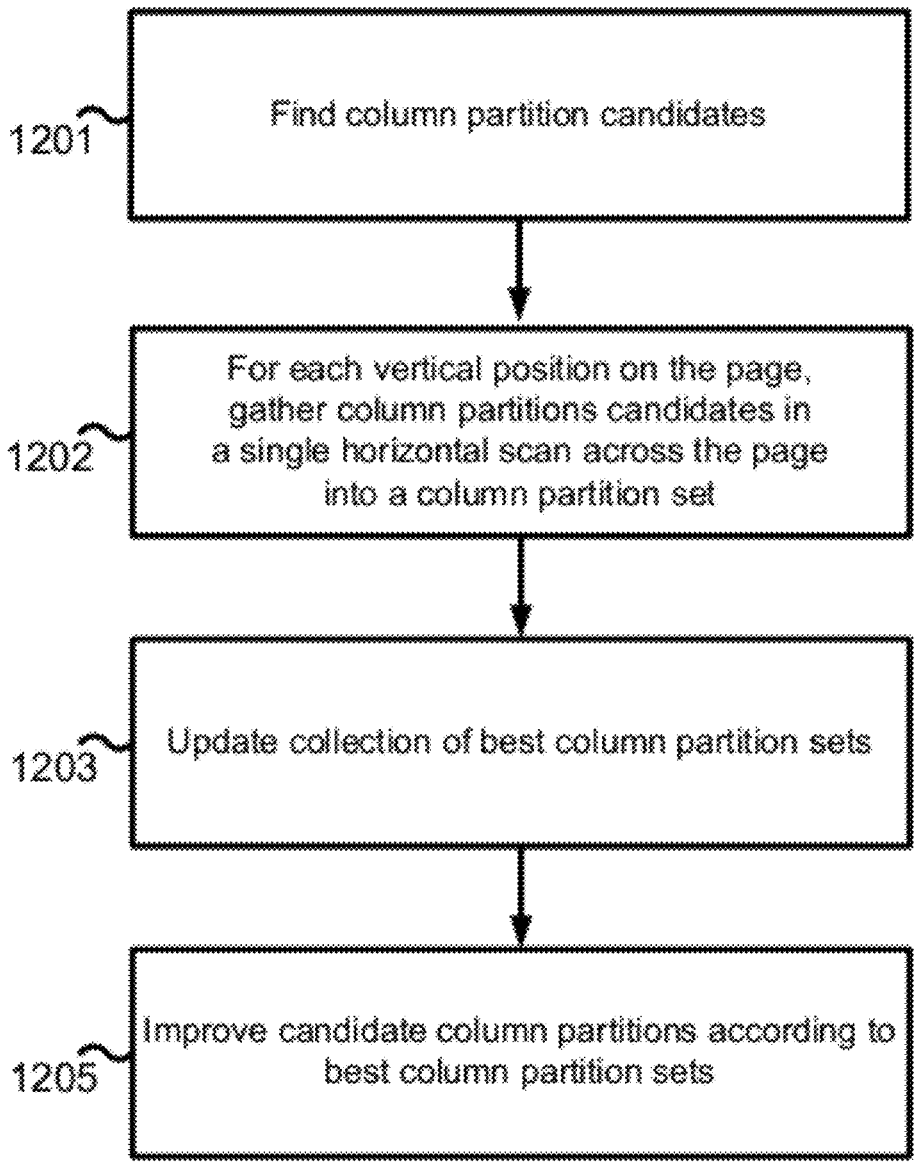
FIG. 12 is a flowchart illustrating a method of creating partitions, in accordance with one embodiment.

Referring back to FIG. 3, the process of finding the column layout 305 continues with the creation of column partitions. FIG. 12 is a flowchart illustrating a method 1200 of creating column partitions, in accordance with one embodiment.

In step 1201 of the method 1200, column partition candidates are found by scanning connected components from left to right and top to bottom. Runs are gathered of similarly classified (text, image, or unknown) connected components into column partition candidates, subject to the constraint that no column partition candidates may cross a tab-stop line.

In step 1202 of the method 1200, for each vertical position on the page, a collection of column partition candidates from a single horizontal scan across the page are stored in a column partition set (CPSet). Each CPSet is potentially a division of the page into columns at that vertical position. Finding the column layout is therefore a process of finding an optimal set of CPSets that best explains all the CPSets on the page.

A "good" column partition either touches a tab line on both vertical edges of its bounding box, or has a width that is close to a frequently occurring width. Frequently occurring widths are determined from statistics gathered at step 907, when text lines are traced from one tab line to another. The "coverage" of a CPSet is the total width of all the good column partitions that it contains. CPSet A is "better" than CPSet B if CPSet A has (1) greater coverage; or (2) equal coverage but more good column partitions; or (3) equal coverage and equal good column partitions, but more total column partitions.

CPSet A "explains" CPSet B unless one or more of the following are true:
1. The edge of one of B's column partitions lies outside of all of A's column partitions. This is not allowed, as it shows that B has more text than A.
2. The edges of one of B's column partitions fall in different column partitions of A, and the width of the B column partition is a common one, as determined from the statistics gathered on column widths in step 907 discussed above. This means that A has split a column of common width.
3. The right edge of one of B's column partitions falls in the same A column partition as the left edge of the next B column partition, and the other B column partitions are of roughly the same width as the said B column partition. Thus, it looks like A has a different number of columns as compared with B. The same-width condition allows A to explain B with a pull-out. This distinguishes pull-outs from regular columns by pull-outs having a different width to the surrounding columns.
4. Both edges of two column partitions of B fall in the same column partition of A. This means that A has merged two columns of B.

Note that the two edges of one of B's column partitions are allowed to fall into two column partitions of A, as long as the width is not a common one. This allows headings that merge columns in B to be explained by A.

Referring back to FIG. 12, in step 1203, the collection of best column partition sets is updated. If a new column partition set is unique, it is added to the current collection of best column partition sets. If a new column partition set is better than an existing member of the best column partition sets, then that member is replaced with the new column partition set within the collection of best column partition sets. A list of column partition candidates is made from the set of CPSets on the page, ordered best first, and with duplicates eliminated by the CPSet A explains CPSet B rules above. In this process, all image column partitions are ignored.

In step 1205 of the method 1200, after the initial column partition candidates are made, they are improved by adding new column partitions and widening existing column partitions. Existing column partitions are widened according to the edges of column partitions in a different CPSet if the widening does not cause an overlap of column partitions. The purpose is to set the width of each column so that it accommodates all text lines that belong to the column. This mostly benefits right-ragged columns, but even a perfectly justified column edge has variations in the horizontal position of the edges of the characters. A correctly widened CPSet would thus "explain" all CPSets that come from the same column structure. An iterative process then labels the longest segment of consecutive page y-coordinates that is explained by one of the column candidates, using the following procedure:

WHILE a page y-coordinate is unlabelled:
Find CPSet column structure candidate C such that it has the longest run of currently unlabelled page y-coordinates where the CPSets are explained by C
Label y-coordinates in the longest run with the C that had the longest run.
Include in the labeling, short unexplained gaps, and adjacent y coordinates that are not explained by any CPSet column structure candidate.

5. Finding and Ordering Regions

The last of the four main phases of performing the physical page layout analysis by tab-stop detection is applying the column layout to find the polygonal boundaries of and a reading order of regions containing flowing text, headings, and pull-outs. Referring back to FIG. 3, after the column layout is found, the regions of the page are found and ordered into a sensible reading order 307 for the performance of OCR. The process of finding and ordering the regions will be described in more detail with reference to FIGS. 13-14.

As a preliminary matter to finding the regions of a page, in one embodiment, after the columns are found, column partitions are given a type according to how many columns they span. Column partitions within a single column are "flowing." Column partitions that touch more than one column, but do not span to the outer edges of either are "pull-out." Column partitions that completely span more than one column are "heading."

Figure 13A:
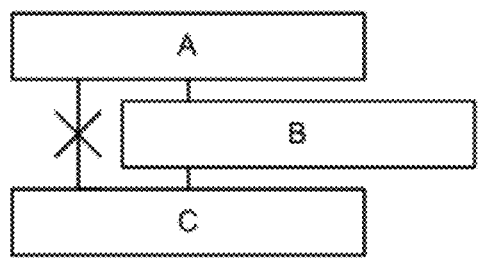
FIG. 13A is an illustration of breaking a transitive partner shortcut, in accordance with one embodiment.
Figure 13B:
FIG. 13B is an illustration of breaking a cycle of partner relationships, in accordance with one embodiment.
Figure 13C:
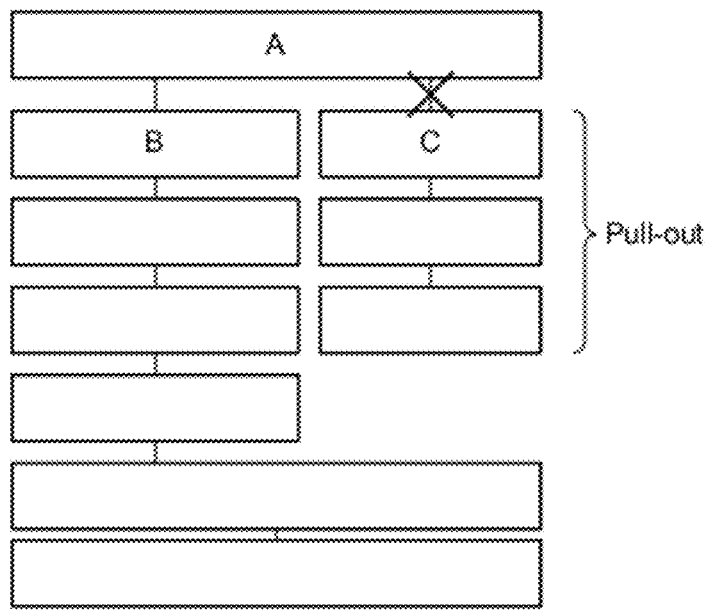
FIG. 13C is an illustration of deleting a partner that has the shortest chain of column partitions, in accordance with one embodiment.
Figure 13D:
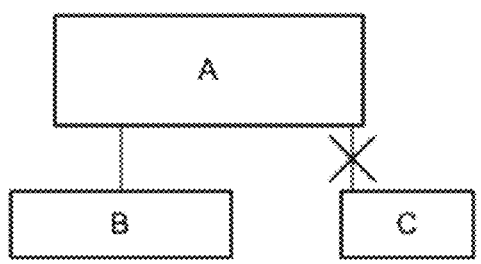
FIG. 13D is an illustration of keeping the partner that has the largest horizontal overlap, in accordance with one embodiment.

To find the regions of a page, the column partitions are combined into flows. To create flows of column partitions, a best matching upper and lower partner is selected for each column partition. The upper and lower partner is the vertically nearest other column partition that overlaps horizontally with the column partition in question. In one implementation, each column partition registers with a partner, so each column partition may have zero or more registered upper and lower partners. Using the following rules in order, the size of the list of registered upper partners is forced to become zero or one, and the size of the list of registered lower partners is forced to become zero or one:

1. Type. If there are multiple types, text can only partner with its own exact type, whereas image can partner with any other image type.
2. Transitive partner shortcuts are broken. As shown in FIG. 13A, if A has 2 partners B and C, and B has C as a partner in the same direction, then delete C as a partner of A, leaving a clean chain A-B-C. Also, as shown in FIG. 13B, if A has a partner B, and B has a partner A in the same direction, break the cycle.
3. (Text only) As shown in FIG. 13C, if A still has 2 partners B, C, follow B and C's partners to determine which has the longest chain. Delete from A the partner that has the shortest chain, and convert the type of the shortest chain to pull-out.
4. (Image only) As shown in FIG. 13D, choose the partner column partition with the largest horizontal overlap, and delete the other one or more partners.

All column partitions now have 0 or 1 partners. Even so, (re)run rule 1 above. This purifies all chains of text to a single type and splits text chains from image chains. Image chains are purified by setting all column partitions in a chain to the most general type in the chain. Chains of text column partitions are further divided into groups of uniform line-spacing, which make text blocks. Now each chain of column partitions represents a candidate region.

Figure 14:
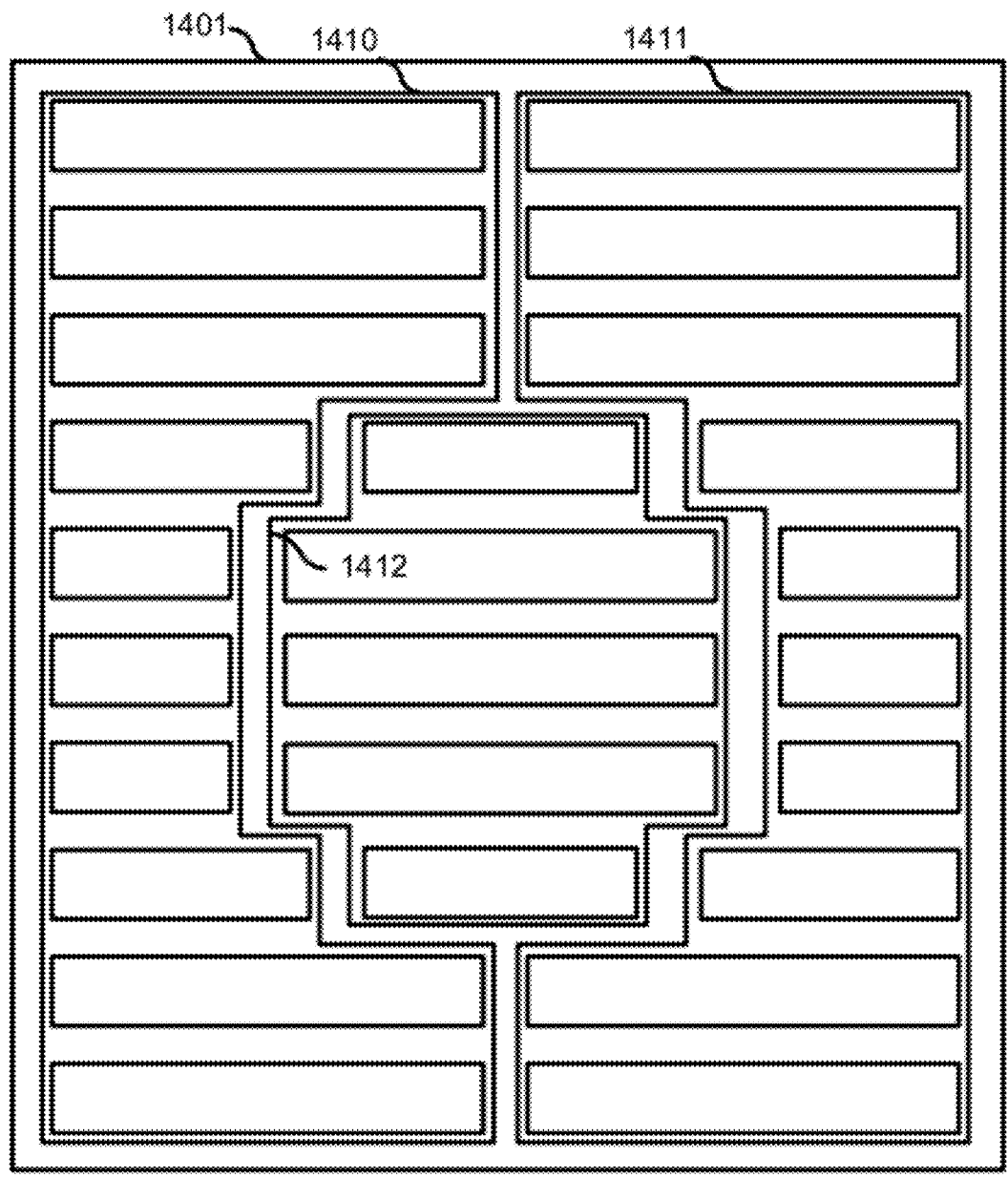
FIG. 14 is an example of a page divided into region polygons, in accordance with one embodiment.

It is also useful to find the polygon boundaries for each region as part of step 307 of the method 300. For simplicity of implementation, the region polygons are isothetic. Edges alternate between being horizontal and parallel to the page-mean tab line, as computed at step 707, which is approximately vertical. The polygon edges are selected to minimize the number of vertices, while satisfying the constraint that all column partitions are contained within their region polygon, and no column partition from another region intersects. An example of a page 1401, divided in the region polygons 1410, 1411, and 1412, is shown in FIG. 14.

Referring back to FIG. 3, in step 307, the candidate regions that were found through chains of column partitions above are ordered. Because image and text column partitions were typed as one of three possibilities: flowing, pull-out, and heading, and the page has been divided into sections of a consistent column layout, a reasonable reading order follows these rules:

1. Flowing blocks are read in order from top to bottom on the page within a column.
2. Pull-out blocks are read in order from top to bottom on the page in an imaginary column between the real columns that they touch.
3. A heading spans multiple columns and follows after what is above it in the columns spanned or between the columns spanned. Anything that lies in the same columns below the heading follows after the heading. A horizontal separator line that spans multiple columns is treated the same as a heading.
4. A change in column layout works like a heading. Anything in any columns that are changed (or between them) goes before anything in the new columns. Unchanged columns are unaffected by a change in column layout.
5. Between headings, the content of columns is ordered from left to right.

Thus, by following the above rules, a sensible reading order of regions can be established for OCR purposes. The order of the regions enables the logical reading of text from pages with complex layouts. This information may be output by the OCR service 102 in the form of metadata describing the sensible reading order of the regions of the input image 101, or the information may be used to read the text in the proper order by the recognition module 224 of the OCR service 102.

The above description is included to illustrate the operation of the embodiments and is not meant to limit the scope of the invention. From the above discussion, many variations will be apparent to one skilled in the relevant art that would yet be encompassed by the spirit and scope of the invention. Those of skill in the art will also appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. In addition, the present invention is not described with reference to any particular programming language. It is appreciated that a variety of programming languages may be used to implement the teachings of the present invention as described herein.

What is claimed is:

1. A method of performing physical page layout analysis via tab stop detection, the method comprising:
   receiving an input image;
   determining the physical page layout of the input image, comprising:
      determining connected components from the input image, wherein the connected components comprise connected groups of pixels that may be text;
      identifying a subset of the connected components that are candidates for being located at a tab-stop by, for each respective connected component in question:
         establishing a vertical gutter to a side of the connected component in question;
         determining if neighboring connected components are in the gutter;
         determining if the neighboring connected components are edge-aligned with the connected component in question; and
         identifying the connected component in question as a candidate connected component responsive to no neighboring connected components being in the gutter and neighboring connected components being edge-aligned with the connected component in question;
      forming a plurality of tab-stop lines from the candidate connected components, wherein a tab-stop line defines a position of a tab-stop for a vertical span of a respective tab-stop line;
      creating column partitions from the positions of the plurality of tab-stop lines; and
      forming chains of column partitions to identify regions of the physical page layout of the input image;
   determining a reading order of the identified regions of the physical page layout of the input image; and
   outputting metadata describing at least one selected from a group consisting of the regions and the reading order for use in optical character recognition.

2. The method of claim 1, further comprising:
   performing optical character recognition on text in the determined reading order; and
   outputting the recognized text.

3. The method of claim 1, wherein determining the physical page layout of the input image further comprises:
   forming sets of column partitions that identify regions of uniform column layout of the input image.

4. The method of claim 1, wherein the input image comprises an image of a page having multi-column text in a non-rectangular layout.

5. The method of claim 1, wherein forming a plurality of tab-stop lines from the candidate connected components comprises:
   testing whether neighboring candidate connected components are aligned.

6. The method of claim 1, further comprising adjusting the lengths of associated tab-stop lines to end at a same y coordinate.

7. The method of claim 1, wherein forming chains of column partitions comprises selecting a matching upper and lower partner for each column partition.

8. The method of claim 1, wherein determining the physical page layout of the input image further comprises:
   tracing horizontally from a candidate connected component at a first tab-stop line through vertically overlapping connected components to another candidate connected component at a second tab-stop line; and
   associating the first and second tab-stop lines as opposite sides of a column.

9. A non-transitory computer-readable storage medium storing executable computer program instructions for performing physical page layout analysis via tab-stop detection, the computer program instructions comprising instructions for:
   receiving an input image;
   determining the physical page layout of the input image, comprising:
      determining connected components from the input image, wherein the connected components comprise connected groups of pixels that may be text;
      identifying a subset of the connected components that are candidates for being located at a tab-stop by, for each respective connected component in question:
         establishing a vertical gutter to a side of the connected component in question;
         determining if neighboring connected components are in the gutter;
         determining if the neighboring connected components are edge-aligned with the connected component in question; and
         identifying the connected component in question as a candidate connected component responsive to no neighboring connected components being in the gutter and neighboring connected components being edge-aligned with the connected component in question;
      forming a plurality of tab-stop lines from the candidate connected components, wherein a tab-stop line defines a position of a tab-stop for a vertical span of a respective tab-stop line;
      creating column partitions from the positions of the plurality of tab-stop lines; and
      forming chains of column partitions to identify regions of the physical page layout of the input image;
   determining a reading order of the identified regions of the physical page layout of the input image; and
   outputting metadata describing at least one selected from a group consisting of the regions and the reading order for use in optical character recognition.

10. The computer-readable storage medium of claim 9, wherein the computer program instructions further comprise instructions for:
   performing optical character recognition on text in the determined reading order; and
   outputting the recognized text.

11. The computer-readable storage medium of claim 9, wherein the instructions for determining the physical page layout of the input image further comprise instructions for:
   forming sets of column partitions that identify regions of uniform column layout of the input image.

12. The computer-readable storage medium of claim 9, wherein the input image comprises an image of a page having multi-column text in a non-rectangular layout.

13. The computer-readable storage medium of claim 9, wherein the instructions for forming a plurality of tab-stop lines from the candidate connected components comprise instructions for:
   testing whether neighboring candidate connected components are aligned.

14. The computer-readable storage medium of claim 9, wherein the computer program instructions further comprise instructions for adjusting the lengths of associated tab-stop lines to end at a same y coordinate.

15. The computer-readable storage medium of claim 9, wherein the instructions for forming chains of column partitions comprise instructions for selecting a matching upper and lower partner for each column partition.

16. The computer-readable storage medium of claim 9, wherein the instructions for determining the physical page layout of the input image further comprise instructions for:
   tracing horizontally from a candidate connected component at a first tab-stop line through vertically overlapping connected components to another candidate connected component at a second tab-stop line; and
   associating the first and second tab-stop lines as opposite sides of a column.

17. A computer system for performing physical page layout analysis via tab-stop detection, the computer system comprising:
   a non-transitory computer-readable storage medium storing executable computer program instructions comprising instructions for:
      receiving an input image;
      determining the physical page layout of the input image, comprising:
         determining connected components from the input image, wherein the connected components comprise connected groups of pixels that may be text;
         identifying a subset of the connected components that are candidates for being located at a tab-stop by, for each respective connected component in question:
            establishing a vertical gutter to a side of the connected component in question;
            determining if neighboring connected components are in the clutter;
            determining if the neighboring connected components are edge-aligned with the connected component in question; and
            identifying the connected component in question as a candidate connected component responsive to no neighboring connected components being in the gutter and neighboring connected components being edge-aligned with the connected component in question;
         forming a plurality of tab-stop lines from the candidate connected components, wherein a tab-stop line defines a position of a tab-stop for a vertical span of a respective tab-stop line;
         creating column partitions from the positions of the plurality of tab-stop lines; and
         forming chains of column partitions to identify regions of the physical page layout of the input image;
      determining a reading order of the identified regions of the physical page layout of the input image; and
      outputting metadata describing at least one selected from a group consisting of the regions and the reading order for use in optical character recognition; and
   a processor configured to execute the computer program instructions stored on the computer-readable storage medium.

18. The computer system of claim 17, wherein the instructions for determining the physical page layout of the input image further comprise instructions for:
   forming sets of column partitions that identify regions of uniform column layout of the input image.

19. The computer system of claim 17, wherein the input image comprises an image of a page having multi-column text in a non-rectangular layout.

20. The computer system of claim 17, wherein the instructions for forming a plurality of tab-stop lines from the candidate connected components comprise instructions for:
   testing whether neighboring candidate connected components are aligned.

21. The computer system of claim 17, wherein the computer program instructions further comprise instructions for adjusting the lengths of associated tab-stop lines to end at a same y coordinate.

22. The computer system of claim 17, wherein the instructions for forming chains of column partitions further comprise instructions for selecting a matching upper and lower partner for each column partition.

23. The computer system of claim 17, wherein the instructions for determining the physical page layout of the input image further comprise instructions for:
   tracing horizontally from a candidate connected component at a first tab-stop line through vertically overlapping connected components to another candidate connected component at a second tab-stop line; and
   associating the first and second tab-stop lines as opposite sides of a column.

24. The method of claim 1, wherein identifying a subset of connected components that are candidates for being located at a tab stop further comprises:
   radially-searching from a connected component in question to identify neighboring connected components that are near the connected component in question.

25. The computer-readable storage medium of claim 9, wherein identifying a subset of connected components that are candidates for being located at a tab stop further comprises:
   radially-searching from a connected component in question to identify neighboring connected components that are near the connected component in question.

26. The computer system of claim 17, wherein identifying a subset of connected components that are candidates for being located at a tab stop further comprises:
   radially-searching from a connected component in question to identify neighboring connected components that are near the connected component in question.

* * * * *

UNITED STATES PATENT AND TRADEMARK OFFICE
CERTIFICATE OF CORRECTION

PATENT NO. : 8,249,356 B1
APPLICATION NO. : 12/357004
DATED : August 21, 2012
INVENTOR(S) : Raymond Wensley Smith It is certified that error appears in the above-identified patent and that said Letters Patent is hereby corrected as shown below:

Col. 15, Claim 17, line 48, delete "clutter," and insert --gutter--.

Signed and Sealed this
Twenty-sixth Day of February, 2013

Teresa Stanek Rea
*Acting Director of the United States Patent and Trademark Office*